United States Patent
Haimer (10) Patent No.: US 11,358,228 B2
(45) Date of Patent: Jun. 14, 2022

(54) THREADED INSERT FOR SECURING A TOOL IN A TOOL RECEIVING AREA, AND TOOL RECEIVING AREA COMPRISING SUCH A THREADED INSERT

(71) Applicant: FRANZ HAIMER MASCHINENBAU KG, Igenhausen (DE)

(72) Inventor: Franz Haimer, Igenhausen (DE)

(73) Assignee: FRANZ HAIMER MASCHINENBAU KG, Igenhausen (DE)

( * ) Notice: Subject to any disclaimer, the term of this patent is extended or adjusted under 35 U.S.C. 154(b) by 0 days.

(21) Appl. No.: 16/646,044

(22) PCT Filed: Sep. 11, 2018

(86) PCT No.: PCT/EP2018/074389
§ 371 (c)(1),
(2) Date: Mar. 10, 2020

(87) PCT Pub. No.: WO2019/052982
PCT Pub. Date: Mar. 21, 2019

(65) Prior Publication Data
US 2020/0276651 A1 Sep. 3, 2020

(30) Foreign Application Priority Data
Sep. 14, 2017 (DE) ...................... 10 2017 121 363.5

(51) Int. Cl.
*B23B 31/11* (2006.01)
*B23B 31/113* (2006.01)

(52) U.S. Cl.
CPC ............. *B23B 31/11* (2013.01); *B23B 31/113* (2013.01); *B23B 2231/24* (2013.01); *B23B 2240/21* (2013.01); *B23B 2250/16* (2013.01)

(58) Field of Classification Search
CPC ... B23B 31/11; B23B 31/113; B23B 2231/24; B23B 2240/04; B23B 2240/21; Y10T 279/17982
See application file for complete search history.

(56) References Cited

U.S. PATENT DOCUMENTS 6,254,303 B1 * 7/2001 Falat ..................... B23B 31/113
  403/321
6,739,810 B2 * 5/2004 Komine .................. B23B 31/11
  409/234

(Continued)

FOREIGN PATENT DOCUMENTS

EP  2486888 A2  8/2012
FR  1409101 A   8/1965

(Continued)

OTHER PUBLICATIONS

International Search Report and Written Opinion of the International Search Authority issued in PCT/EP2018/074389, dated Jan. 22, 2019; ISA/EP.

*Primary Examiner* — Eric A. Gates
(74) *Attorney, Agent, or Firm* — Harness, Dickey & Pierce, P.L.C.

(57) ABSTRACT

The invention relates to a threaded insert for securing a tool provided with a securing thread in a tool receiving area. The threaded insert contains a receiving opening with an inner thread for screwing in the tool at the front end face. According to the invention, the threaded insert has a plug-in region which tapers towards the rear end face and which comprises an outer support surface, and at least one depression for receiving an adhesive is arranged on the outer contact surface. The invention additionally relates to a receiving element for such a threaded insert and to a tool (Continued)

receiving area comprising such a threaded insert and a corresponding receiving element.

39 Claims, 8 Drawing Sheets

(56) References Cited

U.S. PATENT DOCUMENTS

| | | | |
|---|---|---|---|
| 8,066,457 B2 | 11/2011 | Buettiker et al. | |
| 9,468,977 B2* | 10/2016 | McCormick | B23B 31/1075 |
| 9,572,634 B2 | 2/2017 | Krumsiek | |
| 9,901,988 B2 | 2/2018 | Haimer | |
| 9,901,989 B2 | 2/2018 | Haimer | |
| 10,556,275 B2* | 2/2020 | Hinshaw | B23B 31/008 |
| 2002/0021945 A1 | 2/2002 | Harpaz et al. | |
| 2006/0043684 A1* | 3/2006 | Barber | A61B 17/1622 |
| | | | 279/76 |
| 2009/0123244 A1 | 5/2009 | Buettiker et al. | |
| 2012/0208147 A1 | 8/2012 | Krumsiek | |
| 2012/0219375 A1* | 8/2012 | Hobohm | B23B 31/11 |
| | | | 409/234 |
| 2014/0308082 A1* | 10/2014 | Abe | B23B 31/1122 |
| | | | 407/37 |
| 2015/0016905 A1 | 1/2015 | Haimer | |
| 2015/0151365 A1 | 6/2015 | Haimer | |
| 2016/0052061 A1* | 2/2016 | Haimer | B23B 31/1179 |
| | | | 279/20 |

FOREIGN PATENT DOCUMENTS

| | | |
|---|---|---|
| FR | 2602162 A1 | 2/1988 |
| WO | WO-2007003248 A1 | 1/2007 |
| WO | WO-2013117431 A1 | 8/2013 |
| WO | WO-2013178401 A1 | 12/2013 |

* cited by examiner

THREADED INSERT FOR SECURING A TOOL IN A TOOL RECEIVING AREA, AND TOOL RECEIVING AREA COMPRISING SUCH A THREADED INSERT

CROSS-REFERENCE TO RELATED APPLICATIONS

This application is a 371 U.S. National Phase of International Application No. PCT/EP2018/074389, filed on Sep. 11, 2018, which claims priority to German Application No. 10 2017 121 363.5, filed on Sep. 14, 2017. The entire disclosures of the above applications are incorporated herein by reference.

The invention relates to a threaded insert for fastening a tool provided with a fastening thread in a tool receptacle in accordance with the preamble of claim 1. The invention additionally relates to a receiving body for such a threaded insert and to a tool receptacle having such a threaded insert and an associated receiving body.

WO 2013/178401 A1 discloses a tool receptacle having a threaded insert for holding a tool provided with a fastening thread. To protect the thread and for clamping with a high degree of concentricity accuracy, the threaded insert is arranged in a receiving body so as to be movable transversely with respect to the longitudinal axis of the receiving body and is secured against rotation by a transverse pin or a form-fitting connection. In order to ensure the radial movability of the threaded insert, corresponding structural measures are required.

It is an object of the invention to provide a threaded insert, an associated receiving body and a tool receptacle which allows simple and precise mounting of the threaded insert in a corresponding receiving body even without complicated structural measures.

This object is achieved by a threaded insert having the features of claim 1, by a receiving body having the features of claim 12 and by a tool receptacle having the features of claim 16. Expedient developments and advantageous embodiments of the invention are specified in the dependent claims.

For fastening a tool provided with a fastening thread, the thread insert according to the invention has, on a front end face, a receiving opening having an internal thread for screwing in the tool. For fastening the threaded insert in a receiving body, the threaded insert contains a plug-in region which tapers toward a rear end face and which has an outer contact surface on which at least one depression for receiving an adhesive is arranged. The threaded insert can thus be plugged into a receiving opening of a receiving body with an adhesive introduced into the depression and can be held in a firm and rotationally secure manner not only by a press fit between the receiving body and the threaded insert but also by the additional adhesive connection. The threaded insert can thus be mounted in a simple and accurate manner. If required, the adhesive connection can be released for example by corresponding heating of the receiving body, and the threaded insert or the receiving body can be replaced.

The use of an adhesive as a nonmetallic material between two metallic surfaces has various advantages in addition to the load-transferring action, for example vibration damping, sealing against liquids and gases, compensating for different joining part dynamics and corrosion protection. The use of an adhesive which fastens the threaded insert by surface attachment (adhesion) and its inner strength (cohesion) in the receiving opening of a receiving body is thus to be fundamentally distinguished from the known, purely mechanical fastening methods.

Adhesives are scarcely used, if at all, in machine tool engineering and in particular in tool holders in the field of milling cutters. However, a solution which can be applied in practice is now provided for the first time by the particular design of the threaded insert and/or of the receiving opening of a receiving body having depressions for receiving an adhesive. Use is preferably made here of an adhesive based on acrylate, in particular urethane methacrylate.

In one possible embodiment, the plug-in region has a conical outer contour. In an alternative embodiment, the plug-in region of the threaded insert has a polygonal outer contour. In addition to the form-fitted connection and the pressing-on force, this nonround shaping provides additional protection against an unintended rotational movement of the threaded insert.

In a further embodiment, the holding force on the threaded insert is further improved by virtue of an additional fastening by a force fit and/or form fit being provided.

There can thus be provided an additional external thread on the end of the threaded insert that faces the receiving opening of the receiving body, said external thread engaging in a corresponding mating thread in the receiving opening of the receiving body.

It should be expressly stressed here that the threaded connection merely constitutes an additional fastening, that is to say a securement for the exceptional case. The substantial fastening of the threaded insert is achieved by the press fit and in particular the adhesive connection.

As an alternative to an external thread, the threaded insert can have one or preferably more than one blocking grooves which extend spirally around that side of the threaded insert facing the receiving opening of the receiving body. The blocking groove begins here at the rear end face and here has a slope which is particularly preferably at least 40°. In this embodiment, the receiving body has at least one blocking element, preferably a plurality of blocking elements, in its receiving region. The blocking elements can take the form of one or more simple projections which engage in the blocking grooves of the threaded insert in a form-fitting manner, but they particularly preferably take the form of blocking elements which project helically in the circumferential direction and which are spaced apart at the same height and at the same angle in the circumferential direction.

It should also be expressly stressed here that the use of a blocking groove merely constitutes an additional fastening, that is to say a securement for the exceptional case. The substantial fastening of the threaded insert is achieved by the press fit and in particular by the adhesive connection.

In a particularly expedient embodiment, a plurality of depressions distributed over the circumference can be arranged on the outer contact surface of the plug-in region. The depressions can have the shape of a flat groove. The grooves are preferably thin and have a maximum depth of 1.5 mm, better still 0.5 mm. The depression or depressions can extend parallel to the generatrix of the outer surface of the plug-in region. However, they can also extend parallel to the circumference of the outer surface of the plug-in region or helically.

In another advantageous embodiment, the flat grooves extending transversely with respect to the axis of rotation are configured as wider depressions, that is to say in this connection that their width is at least three times the width of the axially extending grooves.

The threaded insert particularly preferably has, depending on the size, from four to six, in particular 5, grooves which extend transversely with respect to the axis of rotation and whose width is chosen such that the webs remaining between the grooves have substantially the same width as the grooves. The same applies to the grooves in the receiving opening of the receiving body.

In a preferred embodiment, the depth of the grooves is at most 5/100 mm, particularly preferably not more than 3/100 mm. In this case too, the receiving opening of the receiving body ideally has corresponding wider depressions. There is provision in particular that the depressions of the threaded insert and of the receiving body come to lie on one another and thus create a particular receiving space for the adhesive. In this embodiment, there is furthermore provision that both the threaded insert and the receiving opening have at least five such depressions extending transversely with respect to the axis of rotation.

It should be expressly pointed out for the sake of clarity that the different forms of the depressions parallel to the generatrix of the outer surface or parallel to the circumference of the outer surface of the plug-in region can be combined with one another.

In a further advantageous embodiment, the receiving opening can contain, between the tool-side front end face and the internal thread, an outer bearing region having a first conical bearing surface and a second conical bearing surface. The first and second conical bearing surface of the outer bearing region preferably have considerably different cone angles. This provides the tool with a supporting region with a double cone which, by contrast with a planar contact or a rectilinear contact surface, allows increased bearing contact and an improved centering and supporting action.

In a further advantageous embodiment, an inner bearing region having a plurality of radially inwardly projecting, web-shaped bearing elements spaced apart from one another in the circumferential direction can be arranged on the threaded insert between an inner end of the receiving opening and the internal thread. This inner bearing region allows the tool to be additionally centered and radially damped.

The threaded insert additionally expediently contains a through-bore via which a coolant or another working fluid can be channeled to the tool or the machining region.

A receiving body of a tool receptacle that is designed for such a threaded insert is characterized according to the invention by a long and slender receiving region in which there is arranged a receiving opening intended for receiving the threaded insert and widening toward an inlet on a front end face of the receiving region.

To reinforce the long and slender receiving region and to damp the tool receptacle during a machining operation, it is possible to arrange there a core composed of a heavy and stable material, preferably of heavy metal, whose density is greater than that of steel. The core can be tubular for example and expediently has a central through-duct. The core can be inserted into a slender central part of a central through-opening of the receiving body. The core can bear here completely against the sides of the central through-opening, or else can be held by enclosing damping elements in the central through-opening and spaced apart from the latter.

The invention additionally relates to a tool receptacle having an above-described receiving body and an associated threaded insert.

The receiving opening of the receiving body and the plug-in region of the threaded insert are expediently adapted to one another in such a way that, in the mounting position of the threaded insert, a gap remains between the tool-side end face of the receiving region and an annular surface on the threaded insert.

In order to facilitate the transfer of coolant and/or lubricant from the central through-duct which is formed in the core, a sealing element can be fitted on the tool-side end of the through-duct, said sealing element bridging the gap between the tool-side end face of the receiving region and an annular surface on the threaded insert. Depending on the configuration of the through-duct, this sealing element can be formed with one or more ducts. In particular, there is provision here that the sealing element projects into an opening designed therefor in the threaded insert.

The seal preferably has a through-duct which extends coaxially to the through-duct. As a result, the coolant or lubricant can be transported in a particularly low-friction manner. In a particularly advantageous embodiment, the diameter of the through-duct corresponds to the diameter of the supply duct, with the result that there also occurs no cross-sectional enlargement in the ducts and the coolant and/or lubricant can be conveyed without recirculation and condensation. In order to have an influence on the pressure of the coolant and/or lubricant, the diameter can also narrow toward the threaded insert so as to ensure a constant pressure on the coolant and/or lubricant by means of such a narrow point.

The sealing element preferably consists here of an elastic material, for example a highly elastic polyurethane elastomer product. Alternatively, any further deformable material is conceivable, for example aluminum, lead, copper, soft iron and the like. It is also possible for memory material to be used.

Such a sealing element can preferably also be provided in the receiving opening for the tool provided with a fastening thread in order, here too, to seal the transfer of coolant and/or lubricant.

Further particular features and advantages of the invention will emerge from the following description of a preferred exemplary embodiment with reference to the drawing, in which.

Figure 1:
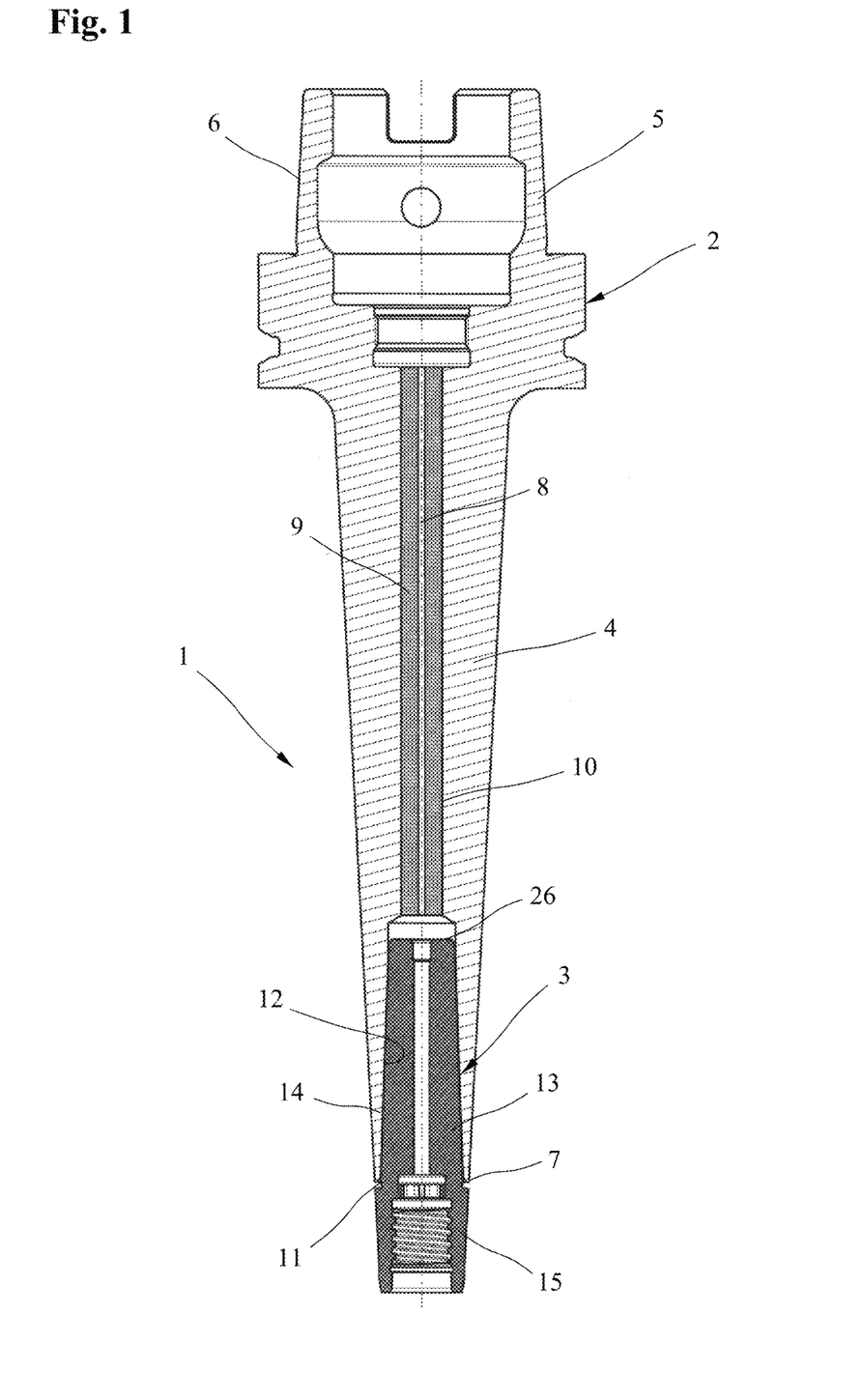
FIG. 1 shows a first embodiment of a tool receptacle having a threaded insert in a longitudinal section.

FIG. 1 shows a tool receptacle 1 having a rotationally symmetrical receiving body 2 and a threaded insert 3 which is fastened in the receiving body 2 and intended for holding a tool provided with a fastening thread. The receiving body 2 has a long and slender front receiving region 4 and a rear clamping region 5 which is arranged at the top in FIG. 1 and intended for holding the receiving body in a working spindle of a machine tool. In the embodiment shown, the machine-side clamping region 5 is configured as an HSK interface having a conical outer clamping surface 6 for reception in a corresponding inner cone of the working spindle of a machine tool or the like. However, the interface at the rear end of the receiving body 2 can also take the form of an SK, JIS, BT, ABS or Capto interface or other suitable interface.

As is apparent from FIG. 1, a core 9, which here takes the form of a tubular reinforcing and damping element having a central through-duct 8 and which is composed of a heavy and stable material, is inserted in the slender receiving region 4 of the receiving body 2 that tapers conically toward a tool-side end face 7. The core 9 serving for reinforcing and vibration damping of the long and slender receiving region 4 is inserted into a slender central part of a central through-opening 10 of the receiving body 2. A conical receiving opening 12 intended for receiving the threaded insert 3 and widening toward an inlet 11 on the front end face 7 of the receiving region 4 is provided at the tool-side end of the receiving region 4.

Figure 2:
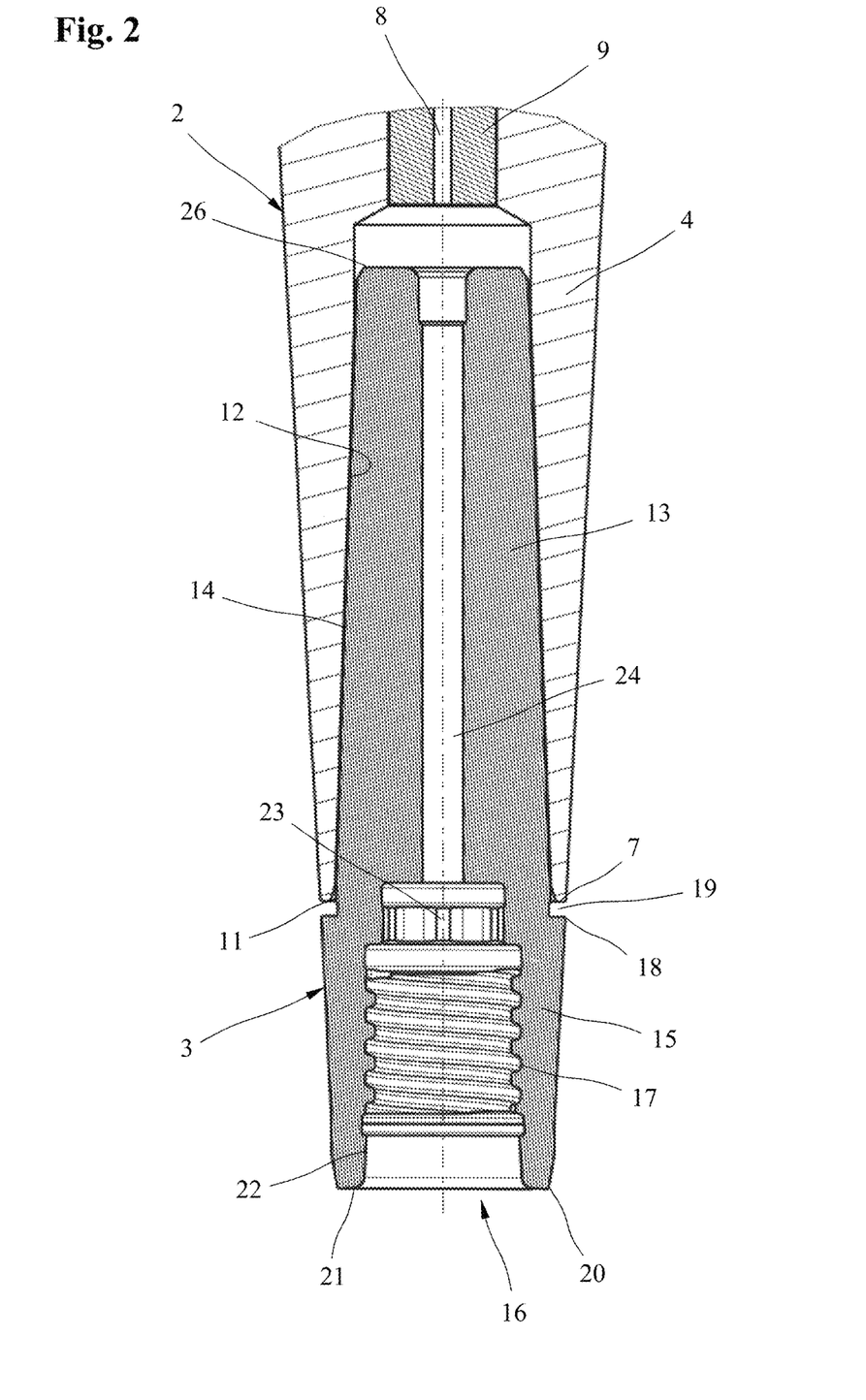
FIG. 2 shows an enlarged partial view of the tool receptacle from FIG. 1.

It is particularly clearly evident from FIG. 2 that the threaded insert 3 contains a plug-in region 13 which is adapted to the receiving opening 12 of the receiving body 2 and which tapers toward a rear end face 26 facing the tool receptacle 1. The plug-in region 13 has an outer contact surface 14. The threaded insert 3 additionally contains a front receiving region 15 having a receiving opening 16 for fastening a tool provided with a thread. For this purpose, the receiving opening 16 has an internal thread 17. In the exemplary embodiment of FIG. 1, the plug-in region 13 has a conical outer contour having a conical outer contact surface 14. The conical receiving opening 12 of the receiving body 2 and the plug-in region 13 of the threaded insert 3 are adapted to one another in such a way that, in the mounting position of the threaded insert 2, a gap 19 remains between the tool-side end face 7 of the receiving body 2 and an annular surface 18 at the transition from the plug-in region 13 to the receiving region 15 of the threaded insert 3. As a result, no axial prestressing is produced between the receiving body 2 and the threaded insert 3.

Between a tool-side front end face 20 of the threaded insert 3 and the internal thread 7, the receiving opening 16 has an outer bearing region having a first conical bearing surface 21 and a second conical bearing surface 22 for contact with corresponding guide surfaces on the tool. The conical bearing surfaces 21 and 22 have different cone angles. The first conical bearing surface 21 has for example a relatively large cone angle of between 140° and 179°, preferably 170°, whereas the second conical bearing surface 22 contains a comparatively smaller cone angle of between 1° and 90°, preferably 10°. A double cone of the type described has the advantage that the smaller cone angle allows good centering of the tool on the threaded insert 3, and the large cone angle allows additional support and centering. The cone angle is to be understood as meaning the opening angle of the cone formed by the conical bearing surfaces 21 and 22.

An inner bearing region having a plurality of radially inwardly projecting, web-shaped bearing elements 23 spaced part from one another in the circumferential direction is provided between an inner end of the receiving opening 16 and the internal thread 17. The tool is guided by these bearing elements 23 so as to be additionally centered and radially damped within the receiving opening 16. An example of the configuration of the receiving opening 16 and the construction of an associated tool is described in DE 10 2015 112 079 A1. The content thereof is fully incorporated herein by reference. A coolant or another working fluid can be channeled to the tool via a through-bore 24 provided in the threaded insert 3 and the through-duct 8 in the core 9.

Figure 3:
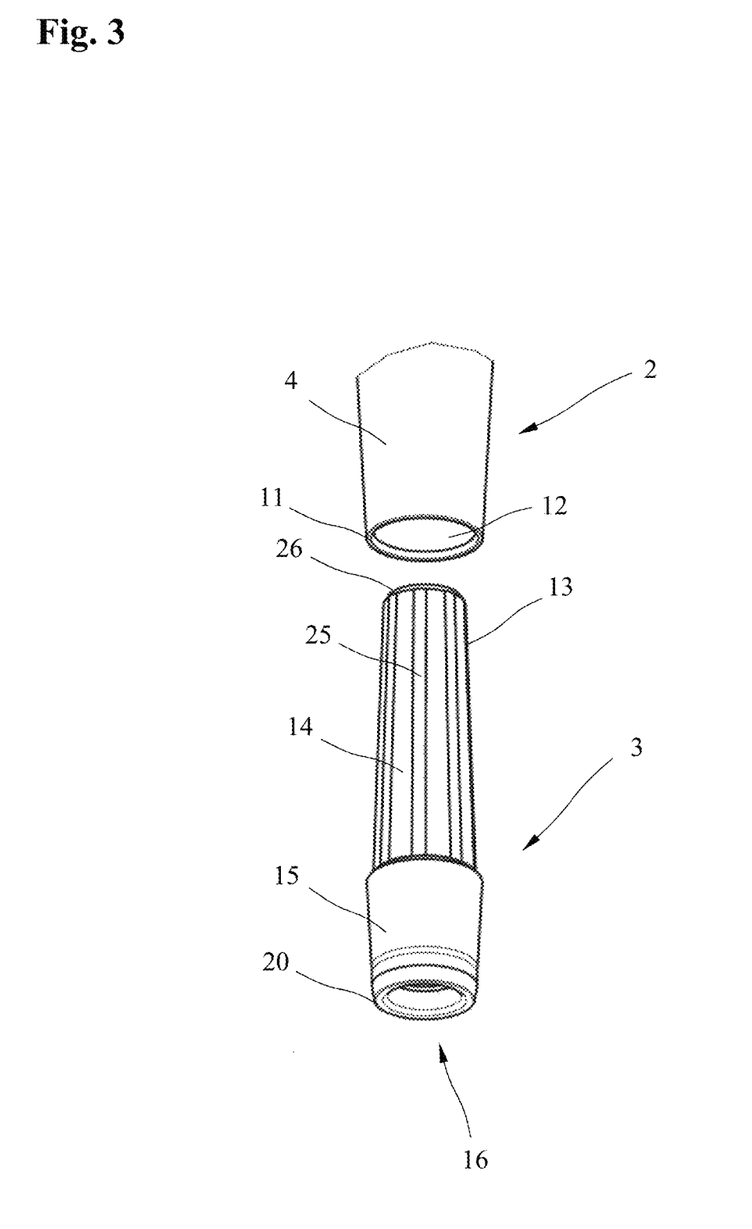
FIG. 3 shows a threaded insert in a perspective view.

It is evident from FIG. 3 that a plurality of depressions 25 for receiving an adhesive are arranged on the conical outer surface 14 on the conical plug-in region 13 of the threaded insert 3. Prior to inserting the threaded insert 3 into the receiving body 2, adhesive can thus be introduced into the depressions 25. As a result, the threaded insert 3 can be held firmly and in a rotationally secure manner not only by a press fit between the receiving body 2 and the threaded insert 3 but also by the additional adhesive connection. If required, the adhesive connection can for example be released by corresponding heating of the receiving body 2 and thus the threaded insert 3 or the receiving body 2 can be replaced. The depressions 25 can preferably extend parallel to the generatrices of the conical outer surface 14. However, in further embodiments, they can also form annular surfaces extending parallel to the circumference of the conical outer surface 14 or have a helical profile. As an alternative to an adhesive connection, the threaded insert 3 can also be brazed with the receiving body 2 or be connected in an integrally bonded manner in another way.

Figure 4:
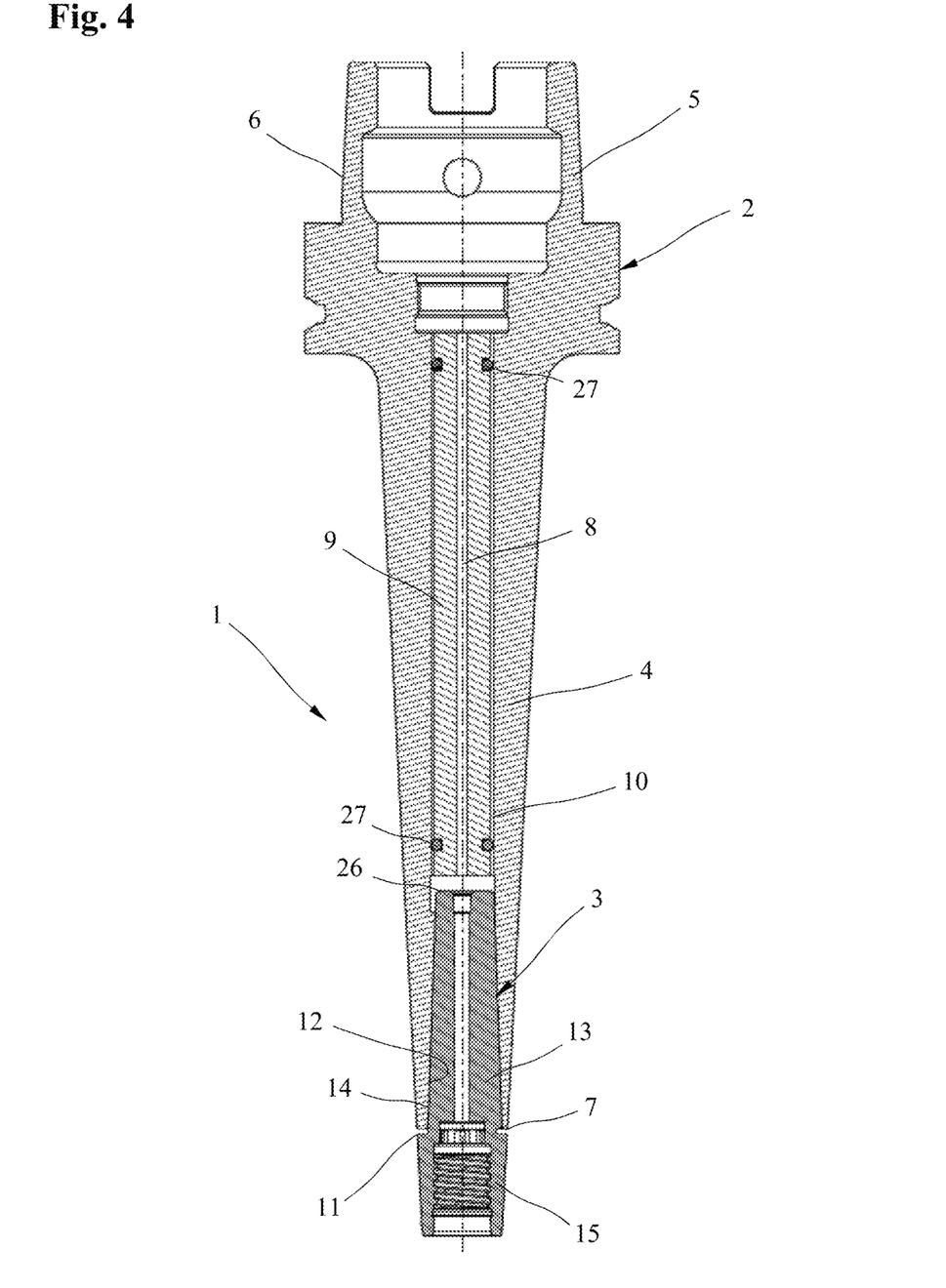
FIG. 4 shows a second embodiment of a tool receptacle having a threaded insert in a longitudinal section.
Figure 5:
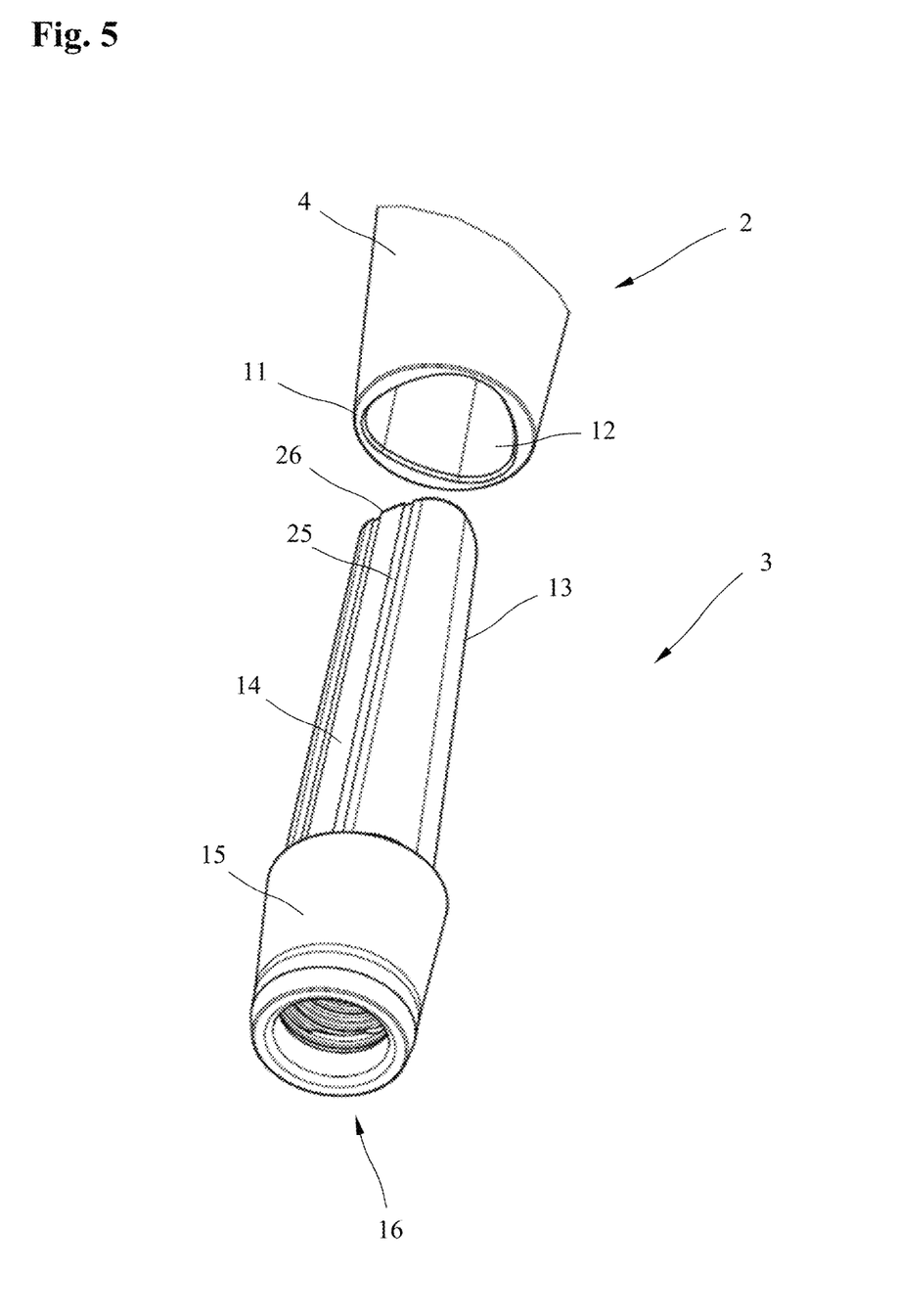
FIG. 5 shows the threaded insert shown in FIG. 4 in a perspective view.

FIGS. 4 and 5 show a further exemplary embodiment of a tool receptacle 1 having a rotationally symmetrical receiving body 2 and a threaded insert 3 which is fastened in the receiving body 2 and intended for holding a tool provided with a fastening thread. This embodiment differs from the preceding exemplary embodiment in that a gap is present between the outer side of the core 9 and the inner wall of the central through-opening 10. Damping elements 27 which are annular here serve to hold the core 9 in the receiving body 2.

As is apparent from FIG. 5, the plug-in region 13 of the threaded insert 3 here has a polygonal outer contour. The receiving opening 12 in the receiving body 2 is adapted to the outer contour of the plug-in region 13 on the threaded insert 3 and accordingly has a polygonal inner contour.

Figure 6:
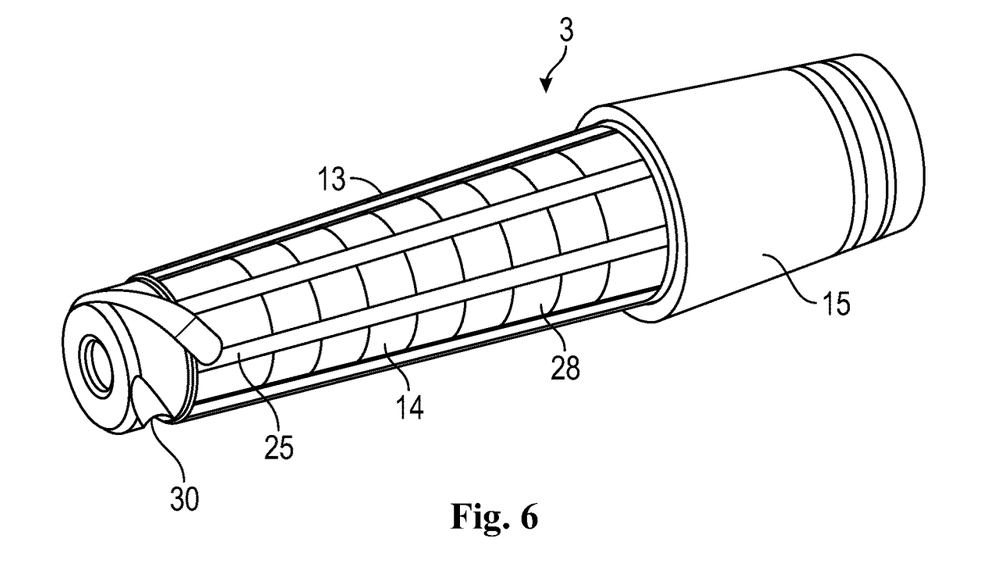
FIG. 6 shows a further embodiment having vertical and horizontal depressions and blocking grooves.

FIG. 6 shows that, in addition to depressions 25 extending longitudinally with respect to the axis of rotation, there are also depressions 28 extending transversely with respect to the axis of rotation. In this case, the receiving region 4 of the receiving body 2 also ideally has corresponding wider depressions (not shown here). There is provision in particular that the horizontally extending depressions 28 of the thread insert 3 and of the receiving body 2 come to lie on one another and thus create a particular receiving space for the adhesive. In this embodiment, there is furthermore provision that both the threaded insert and the receiving opening have at least five such horizontally extending depressions 28.

In this exemplary embodiment, a plurality of blocking grooves 30 are also formed, starting at the rear end face 26.

Figure 7:
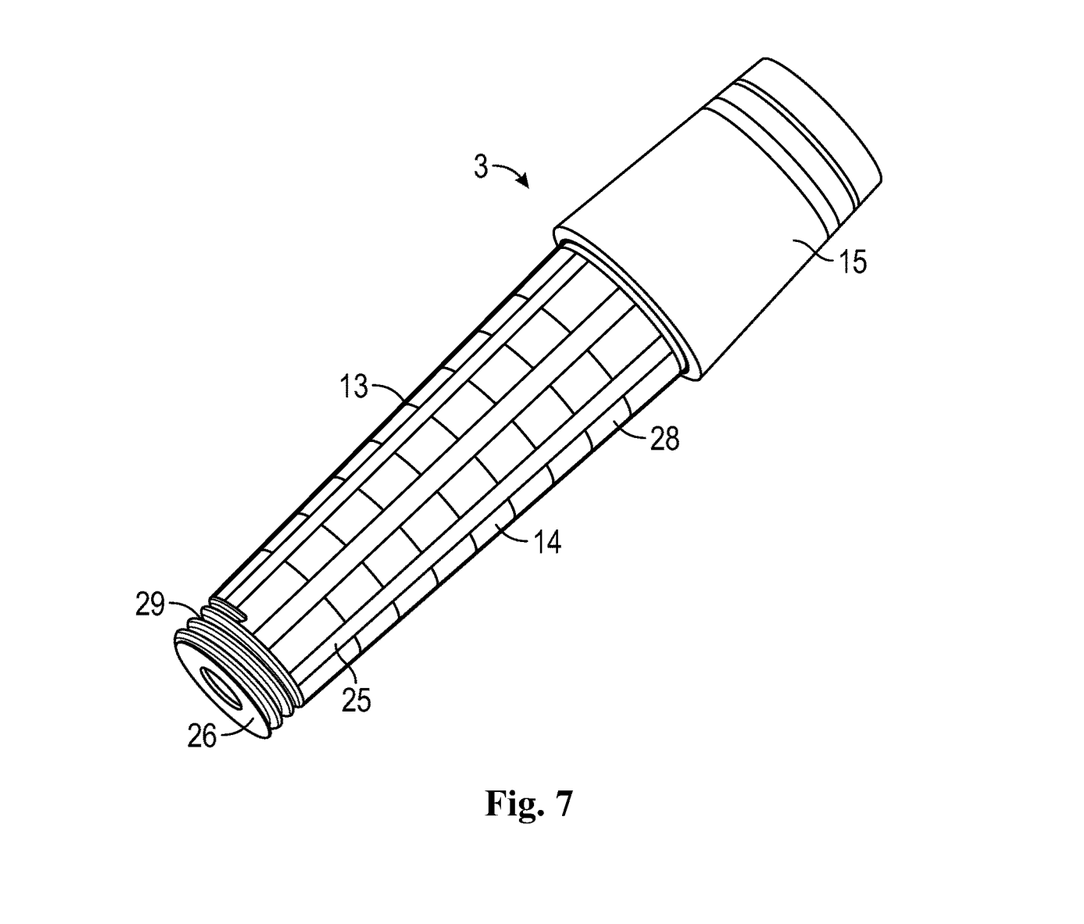
FIG. 7 shows a further embodiment having vertical and horizontal depressions and external thread.

The threaded insert 3 of FIG. 7 is of similar design to that shown in FIG. 6. By contrast thereto, an external thread 29 is formed here, starting at the rear end face 26. In the concrete case, it is a trapezoidal thread, but a V-thread could also be used.

Figure 8:
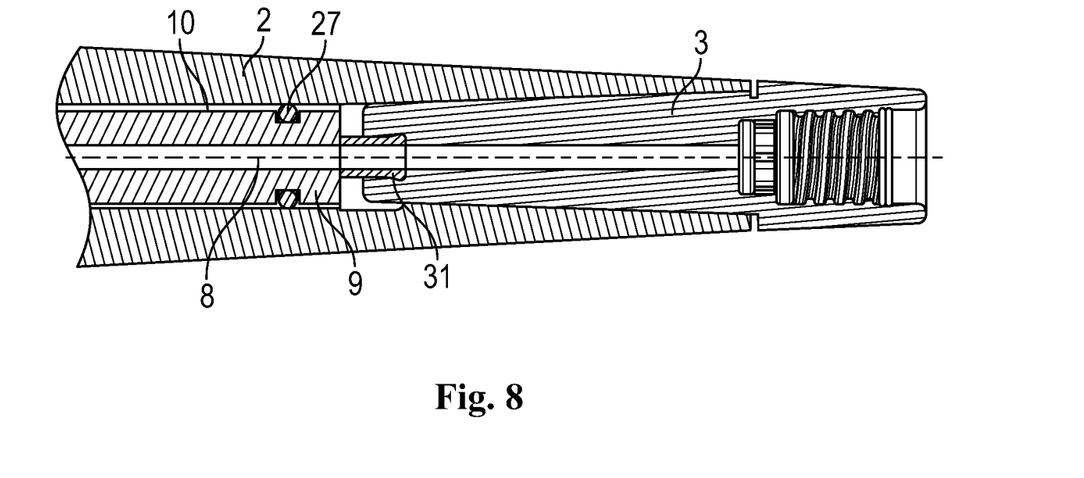
FIG. 8 shows a further embodiment with inserted sealing element.

FIG. 8 shows the tool receptacle 1, which is known substantially already from FIG. 1, with receiving body 2 and threaded insert 3. A sealing element 31 which is formed coaxially to the through-duct 8 is additionally situated here between the receiving body 2 and threaded insert 3. In this figure, both the through-duct 8 and the sealing element 31 are of single-duct design. However, in the case of a multi-duct through-duct 8, the sealing element 31 can also be of multi-duct design.

Figure 9A:
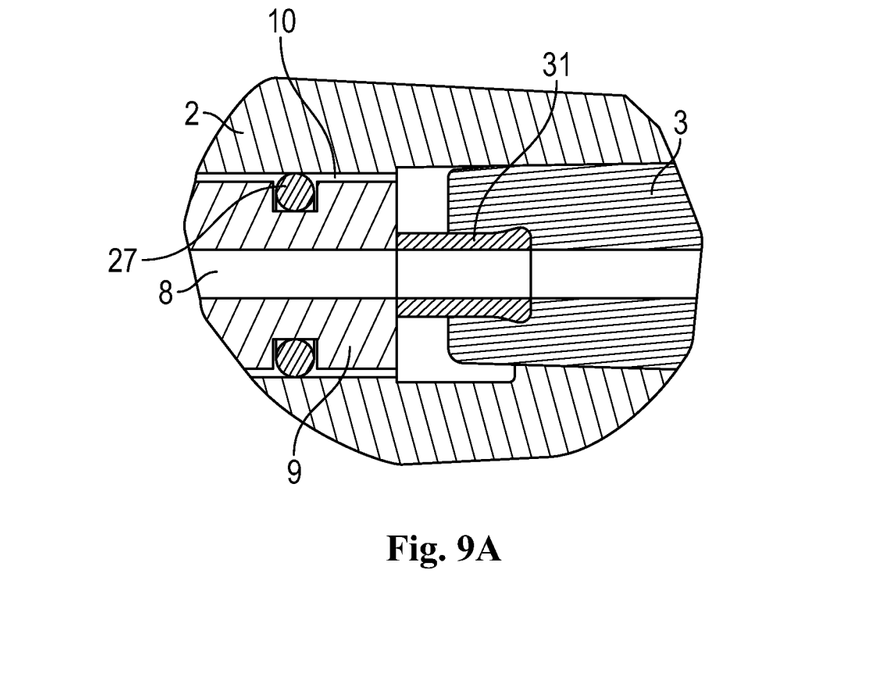
FIGS. 9*a, b, c* show detail views of different embodiments of the sealing element.
Figure 9B:
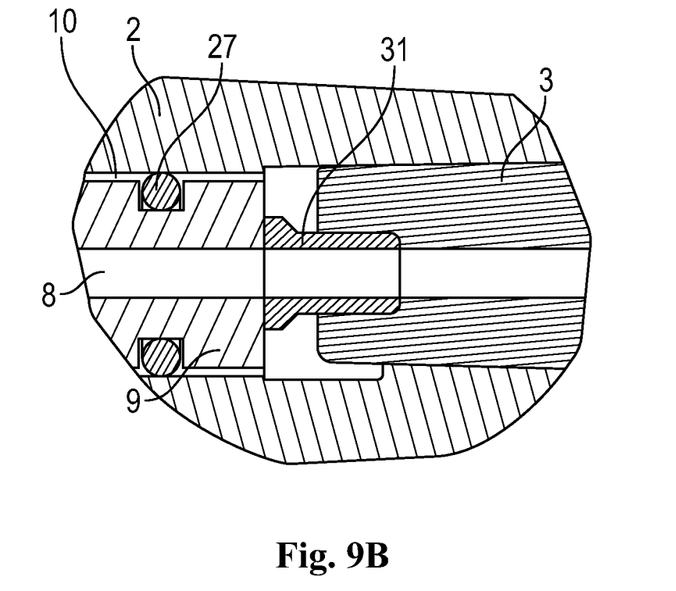
Figure 9C:
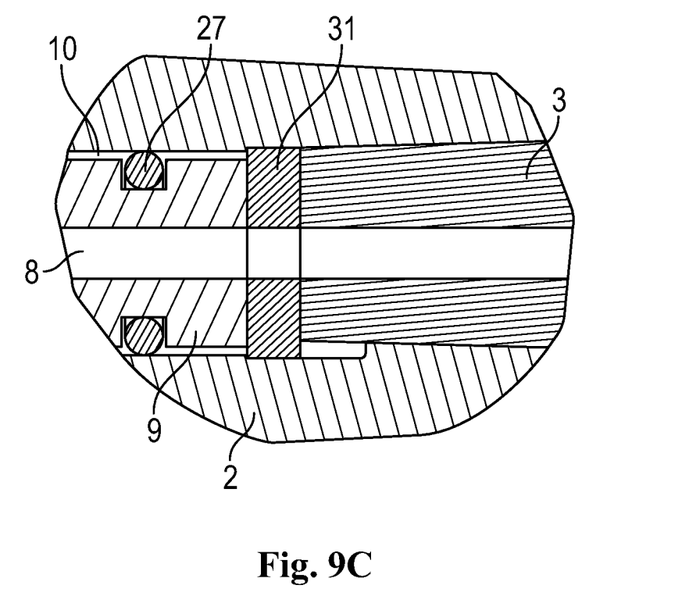

FIGS. 9*a*, 9*b*, 9*c* each show different possible embodiments of the sealing element 31.

FIG. 9a shows a sealing element 31 whose outside diameter widens on the side toward the threaded insert 3 in order to be anchored there in an opening provided therefor.

The sealing element 31 shown in FIG. 9b has, in addition to the widening of the outside diameter shown in FIG. 9a, an additionally enlarged outside diameter on the side facing toward the core 9. However, this additionally enlarged outside diameter does not engage in a clearance, but is positioned as a type of flange on the end face of the core 9.

A further embodiment of the sealing element 31 is shown in FIG. 9c. Here, the sealing element 31 is disk-shaped and bears with full-surface contact by way of its end faces both on the core 9 and on the sealing element 31.

LIST OF REFERENCE SIGNS

1 Tool receptacle
2 Receiving body
3 Threaded insert
4 Receiving region
5 Clamping region
6 Clamping surface
7 End face
8 Through-duct
9 Core
10 Through-opening
11 Inlet
12 Receiving opening
13 Plug-in region
14 Conical outer surface
15 Receiving region
16 Receiving opening
17 Internal thread
18 Annular surface
19 Gap
20 Front end face
21 First conical bearing surface
22 Second conical bearing surface
23 Bearing elements
24 Through-bore
25 Depression (vertical)
26 Rear end face
27 Damping element
28 Depression (horizontal)
29 Thread
30 Blocking groove
31 Sealing element

The invention claimed is:

1. A threaded insert for fastening a tool provided with a fastening thread in a tool receptacle, wherein the threaded insert contains, on a front end face, a receiving opening having an internal thread for screwing in the tool, wherein the threaded insert has a plug-in region which tapers toward a rear end face and which has an outer contact surface, and in that at least one depression for receiving an adhesive is arranged on the outer contact surface; and wherein a plurality of longitudinally extending depressions which are distributed over the circumference are arranged on the outer contact surface of the plug-in region.

2. The threaded insert as claimed in claim 1, wherein the plug-in region has a conical or polygonal outer contour.

3. The threaded insert as claimed in claim 1, wherein the at least one depression is designed in the form of a flat groove.

4. The threaded insert as claimed in claim 1, wherein the at least one depression has a maximum depth of 1.5 mm.

5. The threaded insert as claimed in claim 1, wherein the at least one depression extends parallel to the generatrix of the outer surface of the plug-in region.

6. The threaded insert as claimed in claim 1, wherein the at least one depression extends parallel to the circumference of the outer surface of the plug-in region or helically.

7. The threaded insert as claimed in claim 1, wherein the receiving opening contains, between the tool-side front end face and the internal thread, an outer bearing region having a first conical bearing surface and a second conical bearing surface.

8. The threaded insert as claimed in claim 7, wherein the first conical bearing surface and the second conical bearing surface have different cone angles.

9. The threaded insert as claimed in claim 1, wherein an inner bearing region having a plurality of radially inwardly projecting web-shaped bearing elements spaced apart from one another in the circumferential direction is present between an inner end of the receiving opening and the internal thread.

10. The threaded insert as claimed in claim 1, wherein it contains a through-bore for feeding a working fluid.

11. The threaded insert as claimed in claim 1, wherein the threaded insert has an external thread at its end facing away from the receiving opening.

12. The threaded insert as claimed in claim 1, wherein the threaded insert has a blocking groove at its end facing away from the receiving opening.

13. The threaded insert as claimed in claim 1, wherein a plurality of radially extending depressions distributed over the circumference are arranged on the outer contact surface of the plug-in region.

14. A threaded insert for fastening a tool provided with a fastening thread in a tool receptacle, wherein the threaded insert contains, on a front end face, a receiving opening having an internal thread for screwing in the tool, wherein the threaded insert has a plug-in region which tapers toward a rear end face and which has an outer contact surface, and in that at least one depression for receiving an adhesive is arranged on the outer contact surface; and wherein the at least one depression extends parallel to the generatrix of the outer surface of the plug-in region.

15. The threaded insert as claimed in claim 14, wherein the plug-in region has a conical or polygonal outer contour.

16. The threaded insert as claimed in claim 14, wherein a plurality of longitudinally extending depressions which are distributed over the circumference are arranged on the outer contact surface of the plug-in region.

17. The threaded insert as claimed in claim 14, wherein the at least one depression is designed in the form of a flat groove.

18. The threaded insert as claimed in claim 14, wherein the at least one depression has a maximum depth of 1.5 mm.

19. The threaded insert as claimed in claim 14, wherein the at least one depression extends parallel to the circumference of the outer surface of the plug-in region or helically.

20. The threaded insert as claimed in claim 14, wherein the receiving opening contains, between the tool-side front end face and the internal thread, an outer bearing region having a first conical bearing surface and a second conical bearing surface.

21. The threaded insert as claimed in claim 20 wherein the first conical bearing surface and the second conical bearing surface have different cone angles.

22. The threaded insert as claimed in claim 14, wherein an inner bearing region having a plurality of radially inwardly projecting web-shaped bearing elements spaced apart from one another in the circumferential direction is present between an inner end of the receiving opening and the internal thread.

23. The threaded insert as claimed in claim 14, wherein it contains a through-bore for feeding a working fluid.

24. The threaded insert as claimed in claim 14, wherein the threaded insert has an external thread at its end facing away from the receiving opening.

25. The threaded insert as claimed in claim 14, wherein the threaded insert has a blocking groove at its end facing away from the receiving opening.

26. The threaded insert as claimed in claim 14, wherein a plurality of radially extending depressions distributed over the circumference are arranged on the outer contact surface of the plug-in region.

27. A threaded insert for fastening a tool provided with a fastening thread in a tool receptacle, wherein the threaded insert contains, on a front end face, a receiving opening having an internal thread for screwing in the tool, wherein the threaded insert has a plug-in region which tapers toward a rear end face and which has an outer contact surface, and in that at least one depression for receiving an adhesive is arranged on the outer contact surface; and wherein a plurality of radially extending depressions distributed over the circumference are arranged on the outer contact surface of the plug-in region.

28. The threaded insert as claimed in claim 27, wherein the plug-in region has a conical or polygonal outer contour.

29. The threaded insert as claimed in claim 27, wherein a plurality of longitudinally extending depressions which are distributed over the circumference are arranged on the outer contact surface of the plug-in region.

30. The threaded insert as claimed in claim 27, wherein the at least one depression is designed in the form of a flat groove.

31. The threaded insert as claimed in claim 27, wherein the at least one depression has a maximum depth of 1.5 mm.

32. The threaded insert as claimed in claim 27, wherein the at least one depression extends parallel to the generatrix of the outer surface of the plug-in region.

33. The threaded insert as claimed in claim 27, wherein the at least one depression extends parallel to the circumference of the outer surface of the plug-in region or helically.

34. The threaded insert as claimed in claim 27, wherein the receiving opening contains, between the tool-side front end face and the internal thread, an outer bearing region having a first conical bearing surface and a second conical bearing surface.

35. The threaded insert as claimed in claim 34, wherein the first conical bearing surface and the second conical bearing surface have different cone angles.

36. The threaded insert as claimed in claim 27, wherein an inner bearing region having a plurality of radially inwardly projecting web-shaped bearing elements spaced apart from one another in the circumferential direction is present between an inner end of the receiving opening and the internal thread.

37. The threaded insert as claimed in claim 27, wherein it contains a through-bore for feeding a working fluid.

38. The threaded insert as claimed in claim 27, wherein the threaded insert has an external thread at its end facing away from the receiving opening.

39. The threaded insert as claimed in claim 27, wherein the threaded insert has a blocking groove at its end facing away from the receiving opening.

\* \* \* \* \*